(12) United States Patent
Sivaswamy et al.

(10) Patent No.: US 11,271,984 B1
(45) Date of Patent: Mar. 8, 2022

(54) REDUCED BANDWIDTH CONSUMPTION VIA GENERATIVE ADVERSARIAL NETWORKS

(71) Applicant: International Business Machines Corporation, Armonk, NY (US)

(72) Inventors: Hemant Kumar Sivaswamy, Pune (IN); Anvita Vyas, Deori (IN); Vijay Ekambaram, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/216,237

(22) Filed: Mar. 29, 2021

(51) Int. Cl.
*H04L 29/06* (2006.01)
*G06N 20/00* (2019.01)
*H04L 29/08* (2006.01)
*H04L 65/60* (2022.01)
*H04L 67/02* (2022.01)
*H04L 65/80* (2022.01)

(52) U.S. Cl.
CPC ........... *H04L 65/604* (2013.01); *G06N 20/00* (2019.01); *H04L 65/80* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 6,173,317 B1 * | 1/2001 | Chaddha | H04L 29/06 709/219 |
| 6,618,776 B1 * | 9/2003 | Zimmermann | G06F 13/4295 375/240 |
| 8,836,857 B2 * | 9/2014 | Schaffer | H04N 21/222 348/441 |
| 9,854,020 B1 * | 12/2017 | Kum | H04L 65/4092 |
| 9,936,208 B1 * | 4/2018 | Brailovskiy | H04N 19/14 |

(Continued)

FOREIGN PATENT DOCUMENTS

TW    I466547 B    12/2014

OTHER PUBLICATIONS

Avanaki et al., "Quality Enhancement of Gaming Content using Generative Adversarial Networks," Twelfth International Conference on Quality of Multimedia Experience (QoMEX), May 26, 2020, 6 pages. <https://ieeexplore.ieee.org/document/9123074>.

(Continued)

*Primary Examiner* — Scott B Christensen
(74) *Attorney, Agent, or Firm* — Mark Bergner

(57) ABSTRACT

A computer-implemented method comprises determining a desired resolution quality of a media file; determining available resources of a computing device; selecting one of a plurality of Generative Adversarial Network (GAN) plugins based on the determined available resources of the computing device; and estimating a second resolution quality of the media file corresponding to the selected GAN plugin. The second resolution quality is less than the desired resolution quality. The method further comprises communicating with a server to receive the media file at the estimated second resolution quality; converting the received media file from the second resolution quality to the desired resolution quality by using the selected GAN plugin; and outputting the converted media file with the desired resolution quality.

20 Claims, 3 Drawing Sheets

(56) References Cited

U.S. PATENT DOCUMENTS

| | | | | |
|---|---|---|---|---|
| 10,757,360 | B1* | 8/2020 | Breitman | H04N 7/01 |
| 10,856,030 | B1* | 12/2020 | Kum | H04L 65/4092 |
| 2009/0167778 | A1* | 7/2009 | Wei | H04N 7/014 |
| | | | | 345/587 |
| 2014/0038514 | A1* | 2/2014 | Robbins | H04L 67/10 |
| | | | | 455/3.06 |
| 2015/0093015 | A1* | 4/2015 | Liang | G06K 9/6267 |
| | | | | 382/154 |
| 2015/0201042 | A1* | 7/2015 | Shah | H04L 65/4084 |
| | | | | 709/219 |
| 2016/0337680 | A1* | 11/2016 | Kalagi | H04L 65/602 |
| 2017/0345130 | A1* | 11/2017 | Wang | H04N 19/172 |
| 2018/0041788 | A1* | 2/2018 | Wang | H04N 19/164 |
| 2018/0075581 | A1 | 3/2018 | Shi | |
| 2019/0340730 | A1* | 11/2019 | Dimitrov | G06T 5/20 |
| 2019/0373293 | A1* | 12/2019 | Bortman | H04N 19/172 |
| 2019/0378242 | A1* | 12/2019 | Zhang | G06K 9/6201 |
| 2019/0394482 | A1* | 12/2019 | Joshi | H04N 19/50 |
| 2020/0036528 | A1* | 1/2020 | Ortiz | G06N 3/08 |
| 2020/0045351 | A1* | 2/2020 | Paixao | H04N 21/8355 |
| 2020/0275155 | A1* | 8/2020 | Choi | H04N 21/6582 |
| 2021/0044817 | A1* | 2/2021 | Furht | H04N 19/176 |
| 2021/0129019 | A1* | 5/2021 | Colenbrander | H04N 21/4781 |

OTHER PUBLICATIONS

Birla, "Single Image Super Resolution Using GANs—Keras," Medium.com, Nov. 8, 2018, 10 pages. <https://medium.com/@birla.deepak26/single-image-super-resolution-using-gans-keras-aca310f33112>.

Hazra et al., "Upsampling Real-Time, Low-Resolution CCTV Videos Using Generative Adversarial Networks," Electronics 2020, 9(8), 1312, Aug. 14, 2020, 20 pages. <https://www.mdpi.com/2079-9292/9/8/1312>.

Libório Filho et al., "A GAN to Fight Video-related Traffic Flooding: Super-resolution," 2019 IEEE Latin-American Conference on Communications (LATINCOM), Nov. 11-13, 2019, 6 pages. <https://ieeexplore.ieee.org/document/8937966>.

López-Tapia et al., "A Single Video Super-Resolution GAN for Multiple Downsampling Operators based on Pseudo-Inverse Image Formation Models," ResearchGate, Jul. 2019, 12 pages. <https://www.researchgate.net/publication/334191792>.

* cited by examiner

REDUCED BANDWIDTH CONSUMPTION VIA GENERATIVE ADVERSARIAL NETWORKS

BACKGROUND

Often a user uses a browser or other application running on the user's device to stream media content, such as videos. At times, the steamed media content may be paused or delayed due to insufficient bandwidth to accommodate the file size of the streamed media content. For example, a user may wish to view a streamed video in High Definition (HD) quality which has a higher file size than Standard Definition (SD) quality. Depending on the available bandwidth, the HD quality video may encounter problems, such as buffering latency, which results in decreased user satisfaction while consuming the streamed video.

SUMMARY

Aspects of the disclosure may include a computer-implemented method, computer program product, and system. One example of the method comprises determining a desired resolution quality of a media file; determining available resources of a computing device; selecting one of a plurality of Generative Adversarial Network (GAN) plugins based on the determined available resources of the computing device; and estimating a second resolution quality of the media file corresponding to the selected GAN plugin. The second resolution quality is less than the desired resolution quality. The method further comprises communicating with a server to receive the media file at the estimated second resolution quality; converting the received media file from the second resolution quality to the desired resolution quality by using the selected GAN plugin; and outputting the converted media file with the desired resolution quality.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
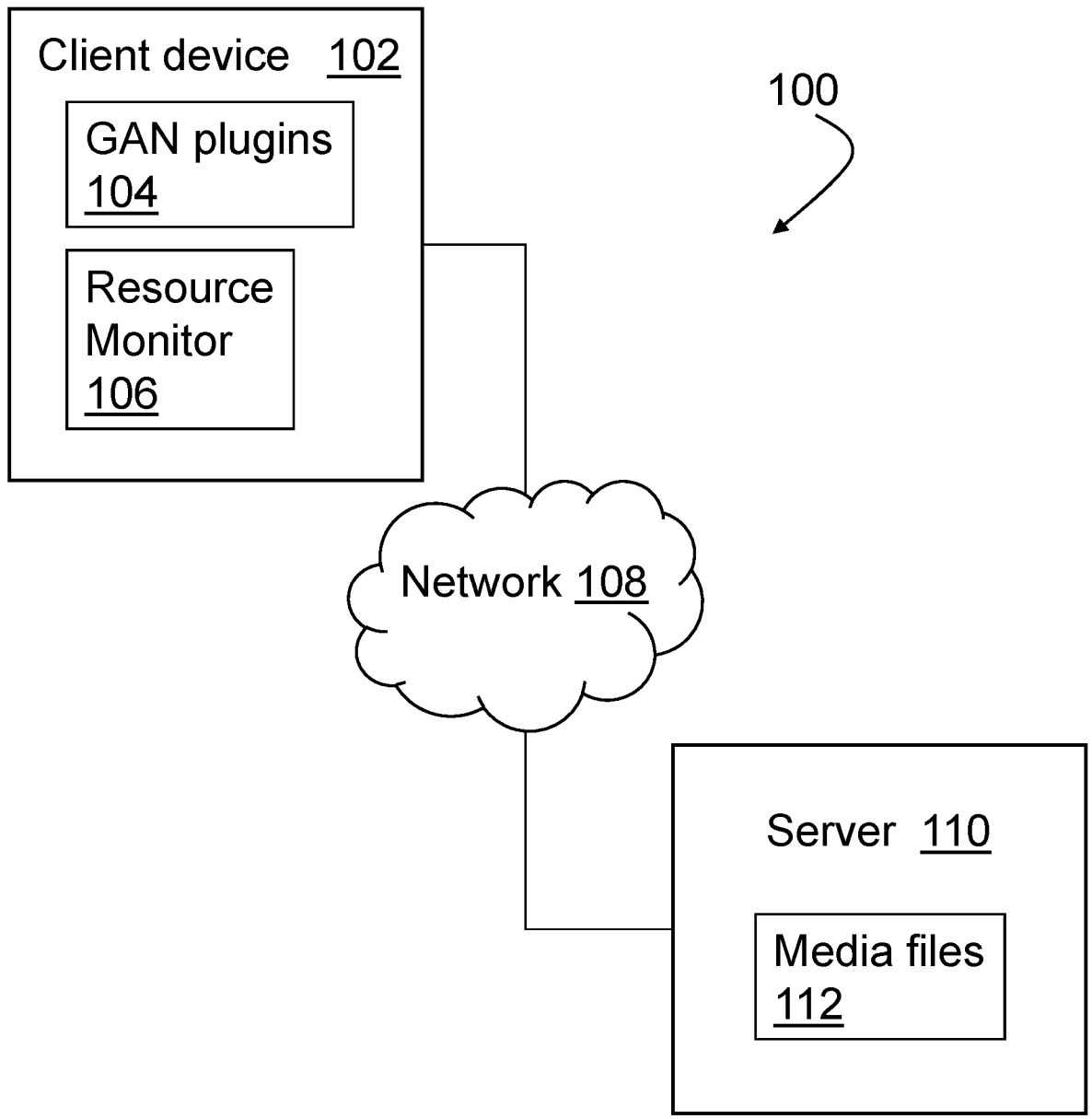
FIG. 1 is a block diagram of one embodiment of an example system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, "a number of" when used with reference items, means one or more items. For example, "a number of different types of networks" is one or more different types of networks.

Further, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. Additionally, the amount or number of each item in a combination of the listed items need not be the same. For example, in some illustrative examples, "at least one of A, B, and C" may be, for example, without limitation, two of item A; one of item B; and ten of item C; or 0 of item A; four of item B and seven of item C; or other suitable combinations.

Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Furthermore, the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

As discussed above, network bandwidth limitations can cause problems, such as through latency buffering issues, with playback of streamed media content in a desired media quality (e.g. HD, Full HD, Quad HD, Ultra HD, etc.) when such desired media quality requires more bandwidth than is available. The embodiments described herein address this problem through the use of selectable Generative Adversarial Network (GAN) plugins to reduce the amount of network bandwidth consumed by the streamed media content while still providing the media content in the media quality desired by the user.

FIG. 1 is a block diagram of one embodiment of an example system 100. The system 100 includes a client device 102 communicatively coupled to a server 110 via a network 108. The network 108 can be implemented using any number of any suitable physical and/or logical communications topologies. The network 108 may include one or more private or public computing networks. For example, network 108 may comprise a private network. Alternatively, or additionally, network 108 may comprise a public network, such as the Internet. Thus, network 108 may form part of a packet-based network, such as a local area network, a wide-area network, and/or a global network such as the Internet. Network 108 can include one or more servers, networks, or databases, and can use one or more communication protocols to transfer data between the server 110 and the client device 102.

Furthermore, although illustrated in FIG. 1 as a single entity, in other examples network 108 may comprise a plurality of networks, such as a combination of public and/or private networks. The communications network 108 can include a variety of types of physical communication channels or "links." The links can be wired, wireless, optical, and/or any other suitable media. In addition, the communications network 108 can include a variety of network hardware and software for performing routing, switching, and other functions, such as routers, switches, base stations, bridges or any other equipment that may be useful to facilitate communicating data.

The server 110 stores a media file 112 which can be provided to the client device 102 via the network 108, such as in response to a request from the client device 102 for the media file 112. It is to be understood that although a single client device 102, a single server 110, and single media file 112 are depicted in FIG. 1 for ease of explanation, in other embodiments, more than one client device 102, more than one server 110, and/or more than one media file 112 can be utilized. For example, copies of the same media file 112 can be stored across a plurality of servers 110, in some embodiments. Additionally, a single media file 112 can be distributed across a plurality of servers 110, in some embodiments. Furthermore, a plurality of different media files can be stored on the same server 110 and/or across a plurality of servers 110. In addition, a plurality of client devices 102 can request the same media file 112 or different media files 112 from the same or different servers 110, in some embodiments.

Client device 102 includes a plurality of GAN plugins 104 and a resource monitor 106. GANs are a type of neural network that can use unsupervised machine learning for converting low quality images/videos to high quality images/videos. In particular, GAN architecture includes a generator model and a discriminator model. The generator model is used to generate new possible examples for the sample domain, e.g. new pixels for an image. The discriminator model is used to determine which pixels are real or original pixels and which are fake or generated pixels. The two models can be trained together towards reaching a point where the discriminator model is unable to distinguish between the generated pixels and the real or original pixels. However, it is not necessary that a given GAN model reach a point where the discriminator is unable to distinguish the generated pixels from the original pixels in every case.

The generator model and the discriminator model can be implemented using Convolutional Neural Networks (CNNs). Convolutional Neural Networks (CNN) are a class of deep feed-forward artificial neural networks that have successfully been applied to analyzing visual imagery. Convolutional neural networks are made up of artificial or neuron-like structures that have learnable weights and biases. Each neuron receives some inputs and performs a dot product. A convolutional neural network architecture typically comprises a stack of layers operating to receive an input (e.g., a single vector) and transforms it through a series of hidden layers. Each hidden layer is made up of a set of neurons, where each neuron has learnable weights and biases, where each neuron can be fully connected to all neurons in the previous layer, and where neurons in a single layer can function independently without any shared connections. The last layer is the fully connected output layer and in classification settings it represents the class scores, which can be arbitrary real-valued numbers, or real-valued targets (e.g. in regression). However, it is to be understood that the embodiments described herein are not limited to the use of CNNs to implement the GANs.

The accuracy of a GAN network depends on the architecture of the GAN, for example, the network size or number of layers in the GAN being used. A GAN with a larger size requires more processing resources of the client device 102 than a smaller network size GAN. The plurality of GAN plugins 104 include varying sizes of GANs. As a result, each of the GAN plugins 104 has different requirements for processing resources, such as memory, CPU, etc. Additionally, since each GAN plugin 104 has a different network size, each of the GAN plugins 104 is capable of converting different sized inputs. For example, in some embodiments, the largest GAN plugin, which has the highest resource requirements, is able to convert a 144 pixel (144 p) video to a 1080 p video while the smallest GAN plugin, which has the lowest resource requirements, is only able to convert a 720 p video to a 1080 p video. Thus, the size or resolution quality of the input required is inversely proportional to the size of the GAN plugin network (i.e. the smaller the GAN plugin, the larger pixel or video quality required for conversion to a desired resolution).

In some embodiments, there are 5 GAN plugins from which the client device 102 selects. In some such embodiments, the first or smallest GAN plugin is configured to convert a 720p video to 1080p. The second or next GAN plugin is configured to convert a 480p video to 1080p. The third GAN plugin is configured to convert a 360p video to 1080p. The fourth GAN plugin is configured to convert a 244p video to 1080p. The fifth or largest GAN plugin is configured to convert a 144p video to 1080p. It is to be understood that the video quality/sizes used above are provided for purposes only and that other input video sizes as well as output video sizes can be used in other embodiments. Additionally, it is to be understood that in other embodiments, more than 5 or fewer than 5 GAN plugins of varying sizes can be used.

The client device 102 further includes a resource monitor 106. The resource monitor 106 is configured to monitor the processing capability of the client device 102. That is, the resource monitor 106 tracks the processes and applications that are executing and the amount of resources being utilized (e.g. CPU, memory, bus bandwidth, etc.). Based on the amount of resources being used and the total resource capacity of the client device 102, the resource monitor 106 can determine the amount of resources available for use by one of the GAN plugins 104. Thus, by comparing the amount of resources available for use and the respective amount of resources required by each of the GAN plugins 104, the client device 102 selects one of the GAN plugins 104 for processing the media content received from the server 110.

After selecting one of the GAN plugins 104, the client device 102 estimates the minimum video resolution needed for the selected GAN plugin 104 to convert the video to the desired resolution quality. As discussed above, each of the GAN plugins 104 has a minimum video resolution quality needed as input to convert to the desired output resolution quality. Thus, based on the selected GAN plugin 104 and the desired output quality, the client device 102 can estimate the minimum needed input resolution quality. The client device 102 communicates with the server 110 to instruct the server 110 to send the video file at the minimum input resolution determined by the client device 102. The video file is received at the requested minimum input resolution and the selected GAN plugin 104 processes the received video file to convert it to the desired resolution quality for playback/ viewing by the user.

It is to be understood that the conversion using the selected GAN plugin 104 can be done in real-time as the video is being received. For example, in some embodiments, the user is consuming or viewing the video file while the video file is being streamed from the server 110. In some other embodiments, however, the video file can be completely downloaded or received from the server 110 prior to the user viewing the video file. For example, the user may specify a time at which the user desires to view the video file. In either scenario, the embodiments described herein reduce the amount of bandwidth needed to transmit the video file from the server 110 to the client device 102 since the video file can be transmitted a resolution quality that is lower than the output resolution quality viewed by the user. Thus, since the lower resolution quality results in a smaller file, the amount of bandwidth utilized to transmit the video file is reduced.

Furthermore, in some embodiments, the available resources of client device 102 are not the same or static throughout the process of receiving the video file from the server 110. For example, the client device 102 may begin using more resources for other applications or background processes, as compared to when the media file 112 was initially requested from the server 110, which reduces the amount of resources available for the GAN plugins 104. Alternatively, the client device 102 may begin using fewer resources for other process or application, as compared to when the media file 112 was initially requested from the server 110, which increases the amount of resources available for the GAN plugins 104. Thus, in some embodiments, the resource monitor 106 updates the amount of resources available for use by the GAN plugins 104 as the amount of resources being utilized by other processes/applications changes. The client device 102 is then able to select a different GAN plugin 104 based on the changed available resources and communicates with the server 110 to change the corresponding resolution of the media file 112 being transmitted to the client device 102.

Furthermore, in some embodiments, the resource monitor 106 maintains a history of resource usage data which can include various factors, such as, but not limited to which processes/applications are running; the average length of time and/or maximum/minimum length of time each process/application is run; the average, maximum, and/or minimum amount of each processing resource utilized by each of the processes/applications, etc. In this way, the client device 102 can predict the amount of available resources for a given period of time. For example, in some implementations, the client device 102 does not know how large the media file 112 is or how long the video is. However, the client device 102 can utilize the historical data to predict the available resources for a given period of time, such as but not limited to, a time period of 45 seconds. For example, periods of time can be measured in seconds, minutes, etc.

Thus, the total time to receive the media file 112 can be divided into a plurality successive time periods. The time periods dividing up the total time can be equal in length or can be different sized time periods. For each time period, the client device 102 can predict the available resources for that time period, select a GAN plugin based on the predicted available resources, and communicate with the server 110 to adjust the resolution quality of the media file 112 for that time period such that during each time period, the corresponding resolution quality of the media file 112 is transmitted. In this way, the client device 102 can adjust the input resolution quality of the media file 112 being received during the process of receiving the media file 112 as well as adjust the GAN plugin 104 being used in order to adjust to changes in the available resources while providing a relatively consistent output resolution quality to the user. For example, a background process continues collecting information on resource usage over time. If more resources are available or predicted to be available after a first time period, then the client device 102 can upgrade to a larger GAN plugin 104 for a next successive period of time. Similarly, if less resources are available or predicted to be available after the first time period, then the client device 102 can downgrade to a smaller GAN plugin 104 for the next successive period of time.

Each of the GAN plugins 104 can be pre-trained in some embodiments and loaded onto the client device 102 after having been trained. In addition, the GAN plugins 104 can be implemented as plugins for an internet browser application or for other applications or software programs capable of streaming and/or otherwise receiving media files 112 from a server 110. Furthermore, it is to be understood that the GAN plugins 104 and the resource monitor 106 are described as separate entities in FIG. 1 for ease of explanation. However, it is to be understood that the functions discussed above with respect to the GAN plugins 104, client device 102, and resource monitor 106 can be performed by a single entity and/or be divided among multiple entities in other manners than that described above in the example of FIG. 1. For example, in some embodiments, the functionality of monitoring and predicting the available resources can be performed by a portion of the selected GAN plugin 104 executing during a given time period.

Figure 2:
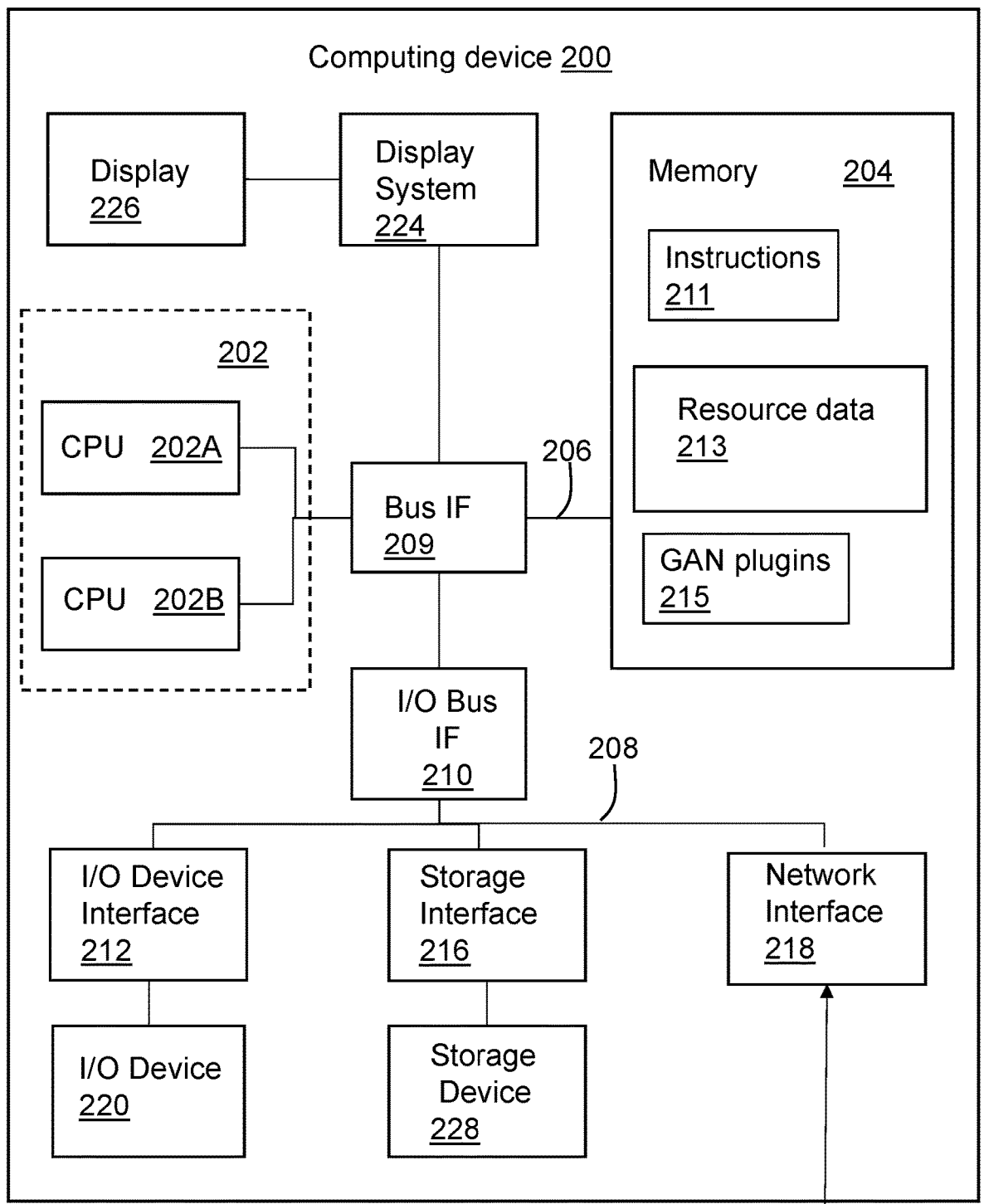
FIG. 2 is a block diagram of one embodiment of an example client device.

FIG. 2 is a block diagram of one embodiment of a computing device 200 configured to implement the functionality of client device 102 including the GAN plugins 104 and resource monitor 106. The components of the computing device 200 shown in FIG. 2 include one or more processors 202, a memory 204, a storage interface 216, an Input/Output ("I/O") device interface 212, and a network interface 218, all of which are communicatively coupled, directly or indirectly, for inter-component communication via a memory bus 206, an I/O bus 208, bus interface unit ("IF") 209, and an I/O bus interface unit 210.

In the embodiment shown in FIG. 2, the computing device 200 includes one or more general-purpose programmable central processing units (CPUs) 202A and 202B, herein generically referred to as the processor 202. In some embodiments, the computing device 200 contains multiple processors. However, in other embodiments, the computing device 200 is a single CPU system. Each processor 202 executes instructions stored in the memory 204. Additionally, although the embodiments are described with respect to central processing unit chips, it is to be understood that the embodiments described herein are also applicable to a computer system utilizing digital signal processors (DSP) and/or graphic processing unit (GPU) chips in addition to or in lieu of CPU chips. Hence, reference to a processor or processing unit herein can refer to CPU chips, GPU chips, and/or a DSP.

In some embodiments, the memory 204 includes a random-access semiconductor memory, storage device, or storage medium (either volatile or non-volatile) for storing or encoding data and programs. For example, the memory 204 stores instructions 211, resource data 213 and a plurality of GAN plugins 215. When executed by a processor such as processor 202, the instructions 211 cause the processor 202 to perform the functions and calculations discussed herein with respect to monitoring, collecting resource data 213, predicting resource usage, selecting one of the GAN plugins 215, and executing the selected GAN plugin 215 to convert video quality of received input media file.

In some embodiments, the memory 204 represents the entire virtual memory of the computing device 200 and may also include the virtual memory of other computer devices coupled to the computing device 200 via a network. In some embodiments, the memory 204 is a single monolithic entity, but in other embodiments, the memory 204 includes a hierarchy of caches and other memory devices. For example, the memory 204 can exist in multiple levels of caches, and these caches may be further divided by function, so that one cache holds instructions while another holds non-instruction data, which is used by the processor. The memory 204 may be further distributed and associated with different processing units or sets of processing units, as is known in any various so-called non-uniform memory access (NUMA) computer architectures, for example. Hence, although the instructions 240, resource data 213, and GAN plugins 215 are stored on the same memory 204 in the example shown in FIG. 2 for purposes of explanation, it is to be understood that other embodiments can be implemented differently. For example, the instructions 240, resource data 213, and/or GAN plugins 215 can be distributed across multiple physical media.

The computing device 200 in the embodiment shown in FIG. 2 also includes a bus interface unit 209 to handle communications among the processor 202, the memory 204, the display system 224, and the I/O bus interface unit 210. The I/O bus interface unit 210 is coupled with the I/O bus 208 for transferring data to and from the various I/O units. In particular, the I/O bus interface unit 210 can communicate with multiple I/O interface units 212, 216, and 218, which are also known as I/O processors (IOPs) or I/O adapters (IOAs), through the I/O bus 208. The display system 224 includes a display controller, a display memory, or both. The display controller can provide video, still images, audio, or a combination thereof to a display device 226. The display memory may be a dedicated memory for buffering video data. The display system 224 is coupled with the display device 226. In some embodiments, the display device 226 also includes one or more speakers for rendering audio. Alternatively, one or more speakers for rendering audio may be coupled with an I/O interface unit. In alternate embodiments, one or more functions provided by the display system 224 are on board an integrated circuit that also includes the processor 202. In addition, in some embodiments, one or more of the functions provided by the bus interface unit 209 is on board an integrated circuit that also includes the processor 202.

The I/O interface units support communication with a variety of storage and I/O devices. For example, the I/O device interface unit 212 supports the attachment of one or more user I/O devices 220, which may include user output devices and user input devices (such as a keyboard, mouse, keypad, touchpad, trackball, buttons, light pen, or other pointing devices). A user can manipulate the user input devices using a user interface, in order to provide input data and commands to the user I/O device 220. Additionally, a user can receive output data via the user output devices. For example, a user interface may be presented via the user I/O device 220, such as displayed on a display device or played via a speaker.

The storage interface 216 supports the attachment of one or more storage devices 228, such as a flash memory. The contents of the memory 204, or any portion thereof, may be stored to and retrieved from the storage device 228 as needed. The network interface 218 provides one or more communication paths from the computing device 200 to other digital devices and computer devices. For example, in some embodiments the computing device 200 can communicate with a server, such as server 110, to request and receive a media file via the network interface 218. Additionally, the computing device 200 can communicate with the server to indicate a desired resolution quality of the media file via the network interface 218.

Although the computing device 200 shown in FIG. 2 illustrates a particular bus structure providing a direct communication path among the processors 202, the memory 204, the bus interface unit 209, the display system 224, and the I/O bus interface unit 210, in alternative embodiments the computing device 200 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 210 and the I/O bus 208 are shown as single respective units, the computing device 200, can include multiple I/O bus interface units 210 and/or multiple I/O buses 208 in other embodiments. While multiple I/O interface units are shown, which separate the I/O bus 208 from various communication paths running to the various I/O devices, in other embodiments, some or all of the I/O devices are connected directly to one or more system I/O buses.

As discussed above, in some embodiments, one or more of the components and data shown in FIG. 2 include instructions or statements that execute on the processor 202 or instructions or statements that are interpreted by instructions or statements that execute on the processor 202 to carry out the functions as described herein. In other embodiments, one or more of the components shown in FIG. 2 are implemented in hardware via semiconductor devices, chips, logical gates, circuits, circuit cards, and/or other physical hardware devices in lieu of, or in addition to, a processor-based system. In addition, in other embodiments, some of the components shown in FIG. 2 can be omitted and/or other components can be included.

Figure 3:
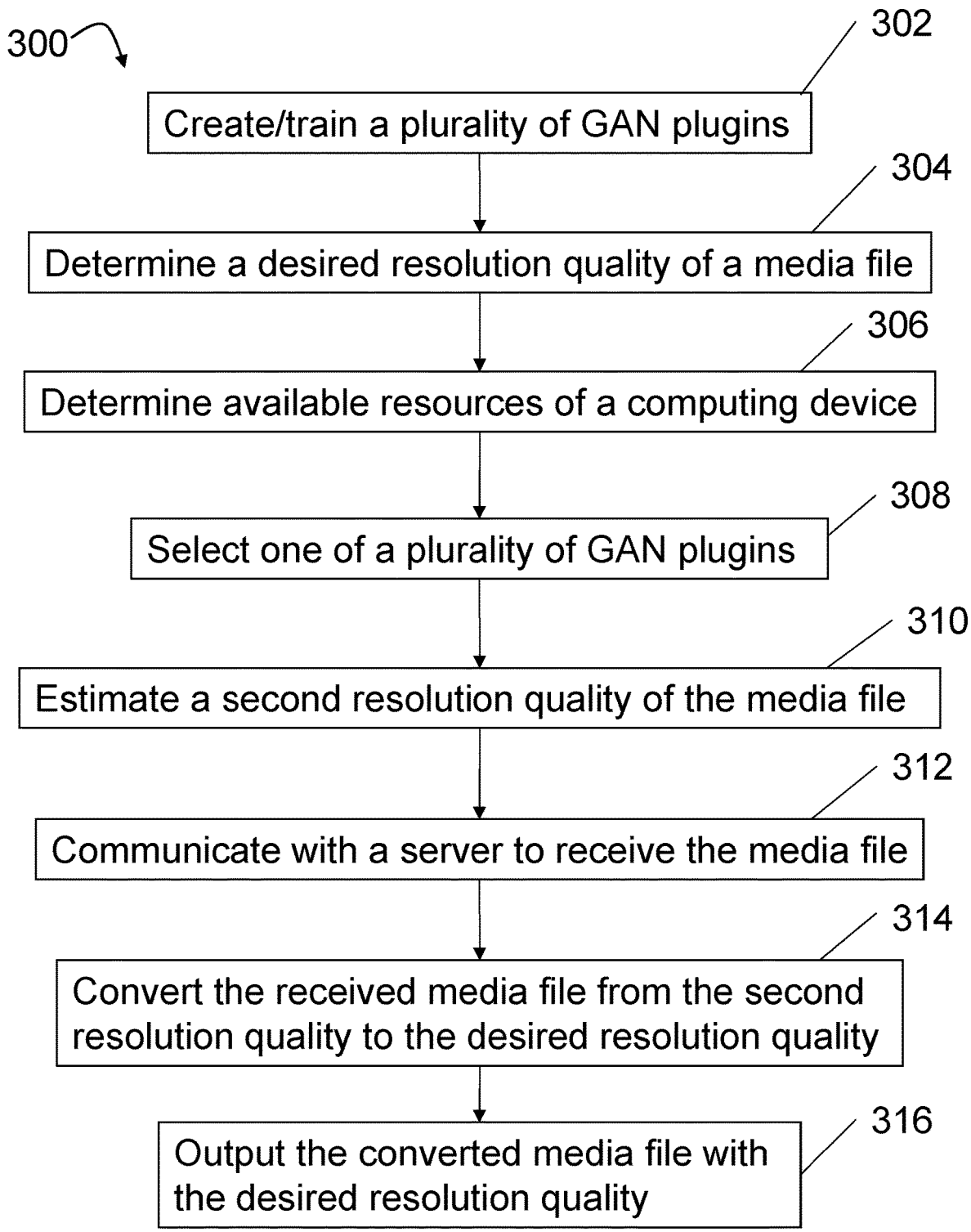
FIG. 3 is a flow chart depicting one embodiment of an example method of reducing bandwidth consumption via Generative Adversarial Networks (GANs).

FIG. 3 is a flow chart depicting one embodiment of an example method 300 of reducing bandwidth consumption via Generative Adversarial Networks (GANs). Method 300 can be implemented by a computing device, such as computing device 200 discussed above. It is to be understood that the order of actions in example method 300 is provided for purposes of explanation and that the method can be performed in a different order in other embodiments. Similarly, it is to be understood that some actions can be omitted or additional actions can be included in other embodiments.

At 302, a plurality of GAN plugins are created and trained. As discussed herein, each of the plurality of GAN plugins can utilize a different network size and have different requirements for minimum input resolution to achieve a selected output resolution. Additionally, each of the GAN plugins can have different requirements for processing resources, such as memory, CPU, etc. from the other GAN plugins. In some embodiments, 5 GAN plugins, each having a different network size are created. Each of the GAN plugins can be pre-trained prior to be loading onto the computing device. Additionally, the GAN plugins can be internet browser plugins in some embodiments. In other embodiments, the GAN plugins can be standalone applications and/or be plugins incorporated into other programs capable of retrieving media files from a server.

At 304, a desired resolution quality of a media file (e.g. image or video file) is determined. For example, a user can select a media file to be retrieved from a server. Such servers can include, but are not limited to, a video sharing website, a social media platform, a file transfer protocol (FTP) server, or other remote location accessed via a local area network or wide area network, such as the internet. In response to detecting the user's selection, the user can be prompted with a question to select a desired resolution quality of the media file, in some embodiments. In other embodiments, the user can enter a desired default resolution quality for media files a priori. In yet other embodiments, the system can learn from user responses to automatically determine, based on historical data, what resolution quality should be delivered to the user. The resolution quality can be indicated using conventional notation, such as 1080p, 720p, etc.

At 306, the available resources of the user's computing device are determined. As discussed above, the available resources can include, but are not limited to, CPU, memory, bus bandwidth, etc. The available resources as used herein refers to the resources that are not being utilized or reserved by another process or application and, thus, are available for use by a GAN plugin to process and convert the received media file. In some embodiments, the currently available resources are determined. In other embodiments, in addition to the currently available resources, future available resources are predicted, as discussed above. For example, as discussed above, resource usage on the user's computing device can be monitored over time to build up a record of historical data. Based on the historical data, future available resources can be determined, in some embodiments. In addition, in some embodiments predicting future available resources includes predicting future available resources for a first period of time and, prior to completion of the first period of time, second future available resources for a second period of time are predicted. For example, as discussed above, the file size of the media file is unknown and, thus, the time to download or receive the media file is broken into smaller periods of time, e.g. 45 seconds. The future available resources for a first 45 seconds can be predicted and then the future available resources for the next 45 seconds can be predicted, and so on until the media file is completely received.

At 308, one of a plurality of Generative Adversarial Network (GAN) plugins is selected based on the determined available resources of the computing device. As discussed above, each of the GAN plugins can have a different size. Thus, each GAN plugin can have different processing or resource requirements based on the size of the GAN. In some embodiments, the same GAN plugin is used for processing the entire media file. However, in other embodiments, multiple GAN plugins can be used. For example, in embodiments in which the time to download or receive the media file is broken into smaller successive time periods, the computing device can select a GAN plugin for each successive time period based on the current available resources and/or predicted available resources for the respective time period. For example, in the example above regarding the first and second time periods, a first GAN plugin can be selected for use during the first time period based on the predicted first future available resources and a second GAN plugin can be selected for use during the second period of time based on the predicted second future available resources. If the first and second predicted future available resources are similar or the same, then the same GAN plugin can be selected (i.e. the first GAN plugin and the second GAN plugin are the same). However, if the first and second predicted future available resources are different, then different GAN plugins can be selected (i.e. the first GAN plugin is different from the second GAN plugin.)

At 310, a second resolution quality for the media file is estimated based on the selected GAN plugin. As discussed above, each GAN plugin has a minimum resolution quality needed to convert a media file to a desired resolution quality. For example, a smaller GAN plugin requires a larger minimum input resolution quality than a larger GAN plugin. The second resolution quality is less than the desired resolution quality, as discussed above, such that the bandwidth usage to receive the media file is reduced.

At 312, the computing device communicates with the server to receive the media file at the estimated second resolution quality. For example, the computing device can contact the server to request that the media file be transmitted at the second resolution quality. Additionally, as discussed above, in some embodiments, different GAN plugins having different sizes can be used at different points in receiving the media file. When a new GAN plugin is selected, the computing device can communicate with the server to request the media file at a new resolution quality (e.g. a third resolution quality) corresponding to the new GAN plugin. In this way, if more resources of the computing device become available, then a larger GAN plugin can be selected and the media file can be received at a lower resolution quality than the desired or second resolution quality. In contrast, if fewer resources of the computing device become available, a smaller GAN plugin can be selected which will require relatively fewer resources than a larger GAN plugin. Thus, the third resolution quality can be larger than the second resolution quality, but still smaller than the desired resolution quality such that bandwidth usage is still reduced as compared to receiving the media file at the desired resolution quality.

Additionally, it is to be understood that in some embodiments, the media file can be requested at a resolution quality that is not the minimum required resolution quality for the selected GAN plugin. For example, if the minimum resolution quality for a selected GAN plugin is 240p, the computing device can in some embodiments, estimate a second resolution quality higher than the minimum 240p but less than the desired resolution quality, such as 360p or 480p.

At 314, the received media file is converted from the second resolution quality to the desired resolution quality using the selected GAN plugin. As discussed above, in embodiments in which multiple different sized GAN plugins are successively selected based on changes in the available resources, then the respective portions of the received media file are converted using the corresponding GAN plugin. The media file is converted to the desired resolution quality and, at 316, is output with the desired resolution quality. For example, the converted media file can be displayed in a display screen of the computing device. Furthermore, it is to be understood that, in some embodiments, the actions performed at 306-314 can be performed substantially simultaneously in real-time as the media file is output at 316. That is, while a portion of the media file is being output/displayed, another subsequent portion is being received and converted while the computing device monitors resource availability and adjusts the selected GAN as needed in response to detected changes in resource availability. In other embodiments, a user can indicate a scheduled time for viewing the media file or download the media file without simultaneously playing the media file. In such embodiments, the conversion can be done prior to the media file being output.

Thus, the embodiments described herein enable the reduction of bandwidth usage in retrieving a media file. This reduction in bandwidth usage can improve user satisfaction in viewing the media file as problems such as buffering latency can be mitigated. Additionally, the reduction in bandwidth usage can have other benefits such as in embodiments where bandwidth usage is metered. However, despite the bandwidth reduction and reduced resolution quality of the retrieved media file, the output resolution quality of the media file is still at the users desired resolution quality.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising, on a client computing device:
    determining a desired resolution quality of a media file;
    performing, in order:
        determining available resources of the client computing device;
        selecting one of a plurality of Generative Adversarial Network (GAN) plugins based on the determined available resources of the client computing device;
        determining a second resolution quality of the media file corresponding to the selected GAN plugin, wherein the second resolution quality is less than the desired resolution quality;
        communicating with a server to receive the media file at the determined second resolution quality;
        receiving the media file at the determined second resolution quality;
        converting the received media file from the second resolution quality to the desired resolution quality by using the selected GAN plugin; and
        outputting the converted media file with the desired resolution quality.

2. The method of claim 1, wherein the second resolution quality is a minimum resolution quality associated with the selected GAN plugin.

3. The method of claim 1, wherein the plurality of GAN plugins includes five GAN plugins, wherein each of the plurality of GAN plugins has a respective different size than the other GAN plugins in the plurality of GAN plugins.

4. The method of claim 1, wherein the plurality of GAN plugins are internet browser plugins that are pre-trained prior to being loaded onto the computing device.

5. The method of claim 1, wherein determining available resources of a computing device includes predicting future available resources of the computing device based on historical data; and
    wherein selecting one of the plurality of GAN plugins comprises selecting one of the plurality of GAN plugins based on the predicted future available resources.

6. The method of claim 5, wherein predicting future available resources of the computing device comprises:
    predicting first future available resources of the computing device for a first period of time; and
    prior to completion of the first period of time, predicting second future available resources of the computing device for a second period of time;
    wherein selecting one of the plurality of GAN plugins comprises:
        selecting a first GAN plugin for use during the first period of time based on the predicted first future available resources; and
        selecting a second GAN plugin for use during the second period of time based on the predicted second future available resources.

7. The method of claim 6, wherein the first GAN plugin is different from the second GAN plugin.

8. The method of claim 1, further comprising:
    monitoring available resources of the computing device while receiving the media file from the server to detect a change in available resources of the computing device; and
    in response to detecting the change in available resources of the computing device, selecting a second GAN plugin from the plurality of GAN plugins based on the detected change in available resources of the computing device;
    estimating a third resolution quality of the media file corresponding to the selected second GAN plugin, wherein the third resolution quality is less than the desired resolution quality and different from the second resolution quality;
    communicating with the server to receive the media file at the estimated third resolution quality; and
    converting the received media file from the third resolution quality to the desired resolution quality by using the selected second GAN plugin.

9. A client computing device comprising:
    an interface communicatively coupled to a server; and
    a processor communicatively coupled to the interface, wherein the processor is configured to:
        determine a desired resolution quality of a media file;
    perform, in order:
        determine available resources of the client computing device;
        select one of a plurality of Generative Adversarial Network (GAN) plugins based on the determined available resources of the client computing device;
        determine a second resolution quality of the media file corresponding to the selected GAN plugin, wherein the second resolution quality is less than the desired resolution quality;
        communicate with the server via the interface to request the media file at the determined second resolution quality;
        receive the media file at the determined second resolution quality;
        convert the media file received from the server at the second resolution quality to the desired resolution quality by using the selected GAN plugin; and
        output the converted media file with the desired resolution quality.

10. The computing device of claim 9, wherein the second resolution quality is a minimum resolution quality associated with the selected GAN plugin.

11. The computing device of claim 9, wherein the processor is configured to predict future available resources of the computing device based on historical data; and
    wherein the processor is configured to select one of the plurality of GAN plugins based on the predicted future available resources.

12. The computing device of claim 9, wherein the processor is configured to:
    predict first future available resources of the computing device for a first period of time; and
    prior to completion of the first period of time, predict second future available resources of the computing device for a second period of time;

select a first GAN plugin for use during the first period of time based on the predicted first future available resources; and select a second GAN plugin for use during the second period of time based on the predicted second future available resources.

13. The computing device of claim 12, wherein the first GAN plugin is different from the second GAN plugin.

14. The computing device of claim 9, wherein the processor is further configured to:

monitor available resources of the computing device while receiving the media file from the server to detect a change in available resources of the computing device; and in response to detecting the change in available resources of the computing device, select a second GAN plugin from the plurality of GAN plugins based on the detected change in available resources of the computing device;

determine a third resolution quality of the media file corresponding to the selected second GAN plugin, wherein the third resolution quality is less than the desired resolution quality and different from the second resolution quality;

communicate with the server to request the media file at the determined third resolution quality; and converting the media file received from the server at the third resolution quality to the desired resolution quality by using the selected second GAN plugin.

15. A computer program product comprising a computer readable storage medium having a computer readable program stored therein, wherein the computer readable program, when executed by a processor on a client computing device, causes the processor to:

determine a desired resolution quality of a media file;

perform the following, in order:

determine available resources of the client computing device;

select one of a plurality of Generative Adversarial Network (GAN) plugins based on the determined available resources of the client computing device;

determine a second resolution quality of the media file corresponding to the selected GAN plugin, wherein the second resolution quality is less than the desired resolution quality;

communicate with a server to request the media file at the determined second resolution quality;

receive the media file at the determined second resolution quality;

convert the media file received from the server at the second resolution quality to the desired resolution quality by using the selected GAN plugin; and output the converted media file with the desired resolution quality.

16. The computer program product of claim 15, wherein the second resolution quality is a minimum resolution quality associated with the selected GAN plugin.

17. The computer program product of claim 15, wherein the computer readable program is further configured to cause the processor to:

predict future available resources of the computing device based on historical data; and select one of the plurality of GAN plugins based on the predicted future available resources.

18. The computer program product of claim 15, wherein the processor is configured to:

predict first future available resources of the computing device for a first period of time; and prior to completion of the first period of time, predict second future available resources of the computing device for a second period of time;

select a first GAN plugin for use during the first period of time based on the predicted first future available resources; and select a second GAN plugin for use during the second period of time based on the predicted second future available resources.

19. The computer program product of claim 18, wherein the first GAN plugin is different from the second GAN plugin.

20. The computer program product of claim 15, wherein the computer readable program is further configured to cause the processor to:

monitor available resources of the computing device while receiving the media file from the server to detect a change in available resources of the computing device; and in response to detecting the change in available resources of the computing device, selecting a second GAN plugin from the plurality of GAN plugins based on the detected change in available resources of the computing device;

determine a third resolution quality of the media file corresponding to the selected second GAN plugin, wherein the third resolution quality is less than the desired resolution quality and different from the second resolution quality;

communicate with the server to receive the media file at the determined third resolution quality; and convert the received media file from the third resolution quality to the desired resolution quality by using the selected second GAN plugin.

* * * * *